United States Patent
Neumair et al.

(10) Patent No.: US 7,219,697 B2
(45) Date of Patent: May 22, 2007

(54) TWIN-SOLENOID VALVE

(75) Inventors: Georg Neumair, Thalhausen (DE); Engelbert Zwingler, Feldkirchen-Westerham (DE)

(73) Assignee: Hawe Hydraulik GmbH & Co. KG, Munich (DE)

( * ) Notice: Subject to any disclaimer, the term of this patent is extended or adjusted under 35 U.S.C. 154(b) by 167 days.

(21) Appl. No.: 11/055,337

(22) Filed: Feb. 10, 2005

(65) Prior Publication Data
US 2005/0178453 A1 Aug. 18, 2005

(30) Foreign Application Priority Data
Feb. 17, 2004 (DE) .................. 20 2004 002 432 U

(51) Int. Cl.
*F16K 11/065* (2006.01)
(52) U.S. Cl. .................................. 137/870; 251/129.2
(58) Field of Classification Search ............... 137/595, 137/625.25, 870, 601.14, 601.15; 251/129.2
See application file for complete search history.

(56) References Cited

U.S. PATENT DOCUMENTS 1,202,895 A * 10/1916 Rogers ...................... 184/67

2,708,561 A 5/1955 Ehlke
4,494,572 A * 1/1985 Loveless ................ 137/596.17

FOREIGN PATENT DOCUMENTS

| DE | 10 85 736 B | 7/1960 |
|---|---|---|
| EP | 0 527 393 A | 2/1993 |
| EP | 1 036 965 A | 9/2000 |

OTHER PUBLICATIONS

European Search Report for German Patent Application No. DE 02004002432, dated Sep. 22, 2004.

* cited by examiner

*Primary Examiner*—John Fox
(74) *Attorney, Agent, or Firm*—Cook, Alex, McFarron, Manzo, Cummings & Mehler, Ltd.

(57) ABSTRACT

In a twin-solenoid valve D comprising two valve members V which are located side by side and are actuated in closing direction by a common solenoid M via a T-shaped force transmitting member, a stem 4 of which is guided in a slide guidance 3, a radial safety clearance X is provided between the slide guidance 3 and the stem 4, and a tilt joint K is formed between the stem 4 and an armature B or a movably guided armature ram 2 of the solenoid M.

19 Claims, 4 Drawing Sheets

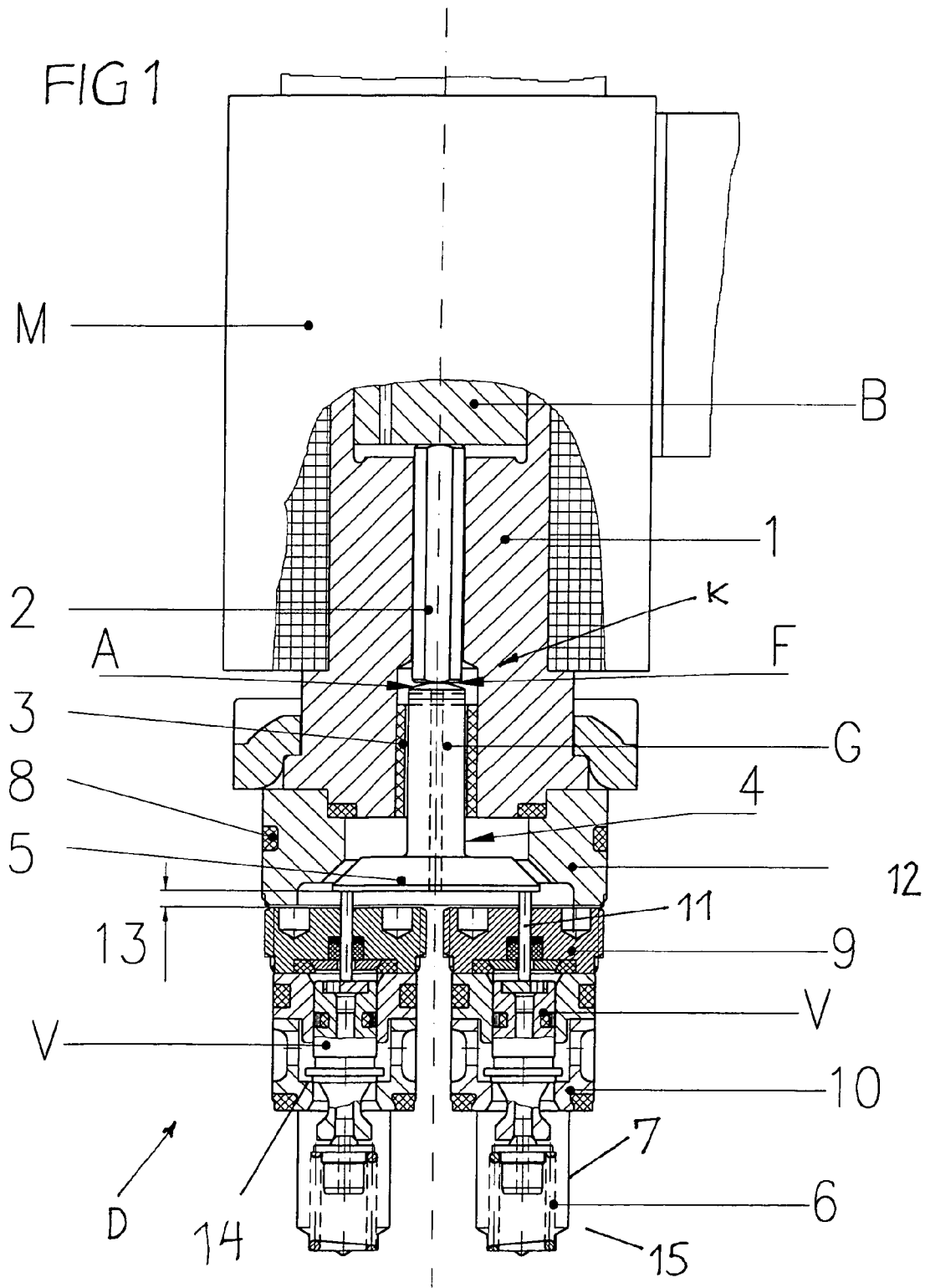

TWIN-SOLENOID VALVE

Figure 1A:
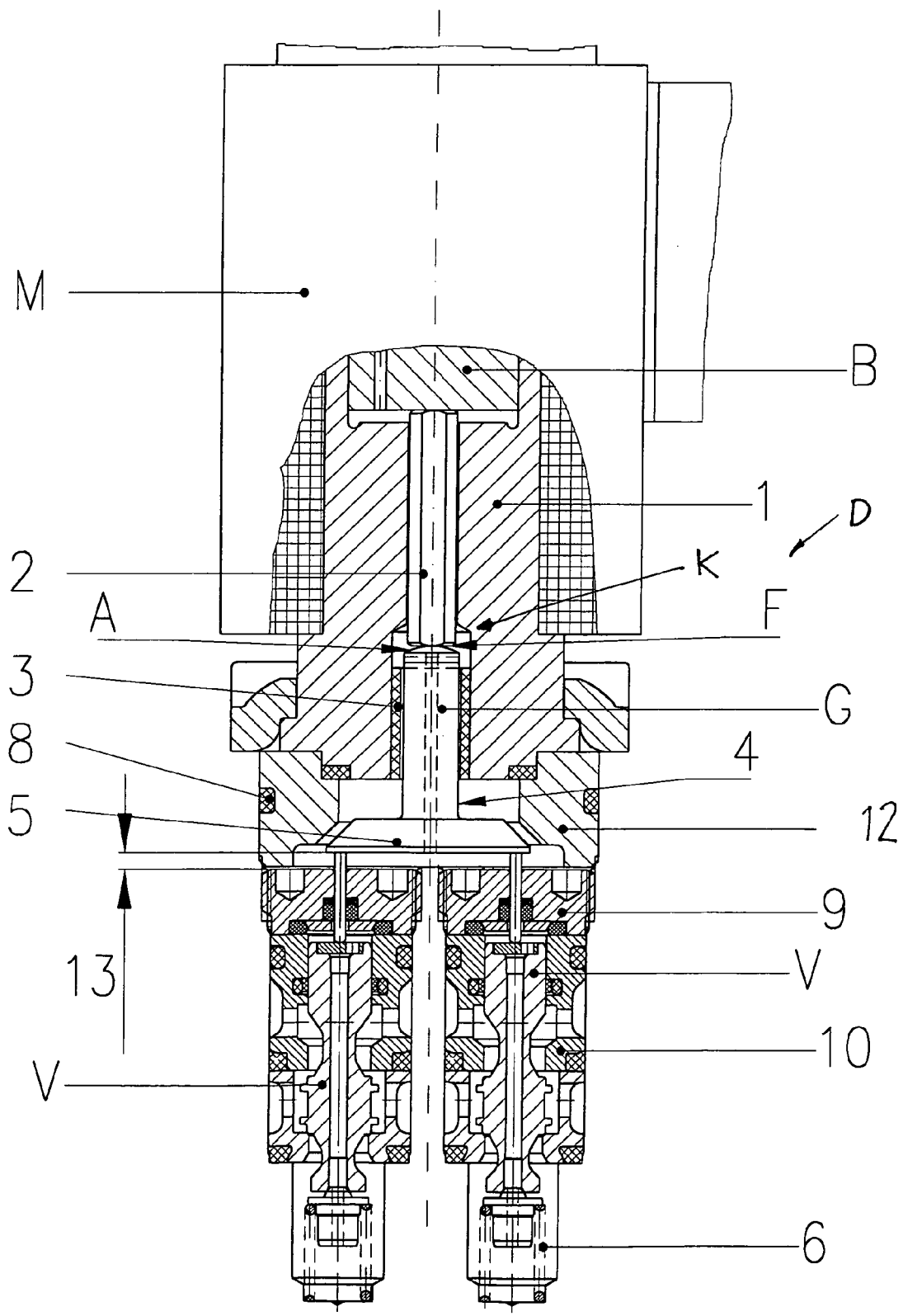

The invention relates to a twin-solenoid valve according to the preamble of claim 1.

Such twin-solenoid valves, as known in practice, e.g. are used in an insertion valve assembly which is inserted in receiving bores of a body which contains flow paths to which the receiving bores lead, e.g. in order to allow the control of certain valve functions by both valve members. Since the common solenoid has to actuate both valve members in closing direction towards valve seats, and due to unavoidable manufacturing tolerances which may result in different long valve member actuation strokes to the closing positions and/or in differing stroke resistance forces of the valve members, the slide fit of the force transmitting member in the slide guidance is selected as firm as possible such that the slide guidance prevents any inclined position of the force transmitting member. However, in this way in some cases the closing positions and the closing forces cannot be defined reliably enough for unavoidable manufacturing tolerances and assembly depending tolerances at the valve seats prevent that one closure member reliably reaches the hermetically sealed closing position in a case where the force transmitting member due to the firm slide fit only actuates the valve member correctly which has been seated first.

It is known from EP 1 036 965 A to form the force transmitting member for actuating the valve members in opening direction like a movable arm of a balance. However, the force transmitting member may assume an inclined position under the force of the common solenoid depending on the valve member which has the higher opening stroke resistance. A stationary abutment surface for the arm of the balance then serves to later also bring the other valve member into the opening position by means of the arm of the balance.

Of interest are furthermore: EP 0 527 393 A, U.S. Pat. No. 2,708,561 A, DE 10 85 736 B.

It is an object of the invention to provide a structurally simple twin-solenoid of the type as disclosed above, having improved functional reliability, particularly a twin-solenoid valve having a short-stroke solenoid for actuating both valve members into the closing positions.

This object is achieved by the features of claim 1.

The radial safety clearance between the stem of the force transmitting member and the slide guidance and the tilt joint transmitting the solenoid force result in combination in a long service life with disturbance proof operation of the twin-solenoid valve. Although the valve members may have differing closing positions in the moving direction of the armature due to tolerances, the solenoid force generated by the solenoid is distributed on both valve members such that each valve member safely reaches its closing position, is seated with the necessary closing force and seals hermetically.

Due to the safety clearance the force transmitting member is allowed to achieve a somewhat inclined position. In case of such an inclined position the force transmitting point of the solenoid force in the tilt joint in some cases deviates from a first central location to the side where the valve member is situated which is seated earlier, however, only by a smaller amount than the width of the coating surfaces in the tilt joint. By this action even the valve member which is seated later is reliably brought into the closing position. Furthermore, no significant lateral force is generated in the tilt joint from the solenoid force, which lateral force otherwise might jam the force transmitting member in the slide guidance.

At the armature or at an axially guided armature ram and at the stem the tilt joint has directly or indirectly contacting first and second surfaces of a special geometrical pairing. The pairing may be: planar/convex or concave/concave or convex/concave or convex/convex. The respective convex or concave surface at least has an arc-shaped curvature in the plane in which both valve members are situated side by side. This results during the force transmission in the necessary movability for seating both valve members and in the desirable effect that the force transmitting point between the surfaces will hardly leave a central position.

The concave or convex arc curvature may be a circular arc curvature, and either is a part of a cylindrical surface with a cylinder axis perpendicular to the plane of the valve members, or a part of a spherical surface with the centre of the sphere situated in the axis of the armature, or the armature ram and/or of the stem. The manufacturing of these type of surfaces is simple.

In the pairing concave/convex the arc curvature may be equal or the convex arc curvature may be even stronger than the concave arc curvature. This does not result in a plane force transmission but in a force transmission via a point contact or a line contact which is of advantage for the movability in the tilt joint.

Alternatively, even planar first and second abutment surfaces may be provided in the tilt joint. In this case one abutment surface is significantly smaller than the other and e.g. is formed at a central projection. This results in a movability similar to the movability in a universal joint and without the drawback that the force transmitting point becomes displaced sidewardly too far.

In a further expedient embodiment a joint ball is provided in the tilt joint between the abutment surfaces. The joint ball enhances the movability in the tilt joint even in an inclined position of the force transmitting member.

When a joint ball is inserted the following geometrical pairings of the first and second abutment surfaces are expedient: planar/planar or planar/concave or planar/convex or concave/concave or concave/convex or convex/convex.

In order to position the joint ball safely it is expedient to provide in at least one abutment surface a central depressed ball seat have a diameter smaller than the ball diameter. In case that movements will take place these movements will take place then between the other abutment surface and the joint ball.

The first and second abutment surfaces may be dimensioned with different sizes.

The slide guidance expediently is formed as at least one plain bearing sleeve fitted into a socket bore of the fixed core part of the solenoid. The force transmitting member is guided, e.g. by the cylindrical stem, in the plain bearing sleeve such that the safety clearance occurs between the stem and the plain bearing sleeve.

The safety clearance can amount to about 2% of the inner diameter of the slide guidance. The result is a relatively loose slide fit which, however, is expedient for a twin-solenoid valve in which both valve members are actuated by a common solenoid via the tilt joint to the closing positions.

A structurally simple concept of an insertion valve assembly can be achieved when each valve member is provided within an inserted sleeve above which a screw-in sleeve is provided in which an actuating ram for the valve member is guided. The force transmitting member faces the screw-in sleeve with a distance which is measured by an excess length of the actuating ram beyond the screw-in sleeve so large that the intermediate space will be kept free between the force transmitting member and the screw-in sleeves when the closing positions of the valve members are reached, and such that the force transmitting member will never abut at a stationary surface.

Figure 2:
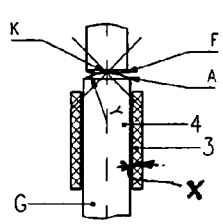
Figure 5:
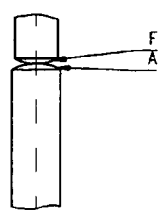
Figure 6:
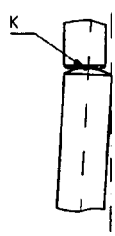
Figure 7:
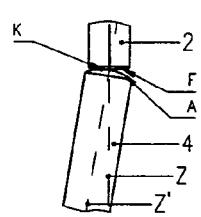

Embodiments of the invention will be explained with the help of the drawings. In the drawings is:

FIG. 1 a partial longitudinal section of a twin-solenoid valve (two 2/2-directional valve) with the solenoid energized, FIG. 1A a partial longitudinal section of another twin-solenoid valve (two 3/2-directional valves) with the solenoid energized, and FIG. 2-18 several variants of a tilt joint for the twin-solenoid valve, wherein FIGS. 2, 6 and 7 illustrate the tilt joint of FIGS. 1 and 1A in more detail.

FIG. 1 illustrates a twin-solenoid valve D, e.g. a twin-insertion valve assembly, for mounting in receiving bores of a hydraulic valve block 15, within the receiving bores connected to respective flow channels. Two valve members V which are situated side by side in a common plane (in FIG. 1 in the drawing plane) have to carry out certain valve functions. Both valve members V are actuated by a common solenoid M which is designed in this case as a short-stroke solenoid. The valve members V are moved counter to spring force from opening positions into the shown closing positions on seats 14 and are held in the closing positions with certain closing forces.

The solenoid M comprises an armature B and an armature ram 2 which is axially displaceably guided in a fixed core part 1. The armature ram 2 actuates a force transmitting member G by the solenoid force in order to actuate both valve members V. The force transmitting member G has a shape of a T and is slidably guided by a stem 4 in a slide guidance 3 provided in the fixed core part 1. The stem 4 is unitarily formed with a lateral part 5.

The two valve members V are seat valve members which are slidably guided respectively in an inserted sleeve 10 and which face the seats 14. Inserted sleeves 10 are assembled together with the valve members V in sealed fashion into bores of the block 15 such that the valve members V are loaded by springs 6 in lifting direction from the seats 14. The springs 6 are arranged in flow channels 7. Screw-in sleeves 9 are then assembled above the inserted sleeves 10 for fixing the inserted sleeves 10 in the respective assembly positions. Actuating rams 11 for both valve members V are guided in sealed fashion in the screw-in sleeves 9. Each of the actuating rams 11 projects beyond the upper side of the screw-in sleeve 9 and co-acts with the lateral part 5 of the force transmitting member G. The amount of the projection of the actuating rams 11 is selected such that even with the solenoid M energized and the valve members V (closing positions) held on the seats 14 the lower side of the lateral part 5 of the force transmitting member G maintains a distance 13 from the upper sides of the screw-in sleeves 9 but does not abut positively. The solenoid M may be inserted by means of an intermediate ring 12 and a sealing 8 also into the block 15. The slide guidance 3 is at least one plain bearing sleeve for the stem.

Alternatively, the armature B could actuate the force transmitting member G directly.

The twin-solenoid valve D in FIG. 1A contains two valve members V, which are structured as seat valve members, and each of which alternatively co-operates with an upper and a lower seat (two 3/2-directional valve functions). The upper closing positions are defined by the springs 6, however, the lower closing positions are defined by the single common solenoid M.

In each embodiment a tilt joint K is provided above the slide guidance 3 between the armature B or the armature ram 2 and the stem 4. The tilt joint K may be structured in detail as shown in FIGS. 2 to 18.

FIG. 2 is a detailed sectional view and belongs either to FIG. 1 or to FIG. 1A in order to emphasise the co-operation between the armature ram 2 and the stem 4 of the force transmitting member G at the tilt joint K. In this embodiment the stem 4 has an abutment surface A which is convexly curved in the plane which is defined in FIGS. 1, 1A by the axes of both valve members V. The abutment surface e.g. may be a part of a cylindrical surface having a cylinder axis Y perpendicular to the plane of both valve members V, or is part of a spherical surface (sphere centre Y). The armature ram 2 has a planar counter surface F which is situated perpendicular to the axis of the ram. The stem is received in the slide guidance 3 with a radial safety clearance X. The safety clearance X e.g. may amount to about 2% of the inner diameter of the slide guidance 3. In case of an inner diameter of about 5 mm the entire safety clearance may be about 0.1 mm.

The counter surface F contacts the abutment surface A for the transmission of the solenoid force and such that the tilt joint K is formed. As long as the stem 4 is coaxial with the armature ram 2 the magnet force is centrally transmitted via the tilt joint K. The abutment surface A e.g. is larger than the counter surface F. However, both surfaces may be of equal size.

Figure 3:
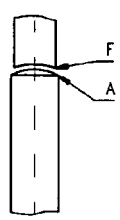

The abutment surface A in FIG. 3 is convexly curved (cylindrical or spherical). Also the counter surface F is curved in the same sense, i.e. is concave (cylindrical or spherical), and may, in some cases, have a larger radius of the curvature than the abutment surface A.

Figure 4:
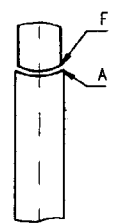

The abutment surface A in FIG. 4 is curved concavely (cylindrical or spherical), while the counter surface F is curved convexly (cylindrical or spherical).

Both the abutment surface A and the counter surface F in FIG. 5 are curved convexly (spherical or cylindrical), i.e., are convex in opposite senses.

It is not necessary that the entire counter surface F or the entire abutment surface A is curved convexly or concavely. Since the safety clearance X is relatively small in relation to the longitudinal extension of the stem 4, the force transmitting member G anyhow is allowed to take an inclined position within a very limited extent such that it would suffice to form respectively only a central portion of the abutment surface A and/or of the counter surface F convexly or concavely.

FIGS. 6 and 7 illustrate what happens if the valve member V on the left side in FIGS. 1, 1A moves with a higher moving resistance or reaches its closing position earlier than the other valve member V. Then the stem 4 will tilt with its axis Z in clockwise direction in relation to the moving axis Z' of the armature which moving axis Z' is defined by the armature ram 2. This tilting movement takes place within the limit of the safety clearance X. The effect of this tilting motion is that either (FIG. 6) the contact point for the transmission of the solenoid force in the tilt joint K is displaced out of the central position of FIG. 2 somewhat to the left side, such that the solenoid force consequently is transmitted somewhat out of centre, or (FIG. 7) that the abutment surface A slides along the counter surface F to the right side as soon as the stem 4 starts to tilt and that then the solenoid force is transmitted substantially centrally. By this effect (FIGS. 6, 7) a clamping or retardation of the stem 4 is avoided in the slide guidance 3. Both valve members V will be brought reliably into the closing positions even if the valve seats are located at different elevations.

As soon as the solenoid M is de-energized, the springs 7 will push the valve members V into the opening positions.

The force of the springs 7 will also push the armature B via the actuating rams, the force transmitting member G and the armature ram 2 back into the home position. During this return action the force transmitting member G automatically will be re-aligned in the tilt joint K.

Figure 8:
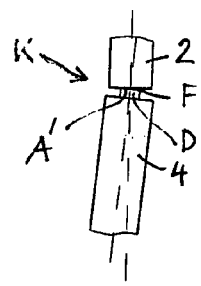
Figure 9:
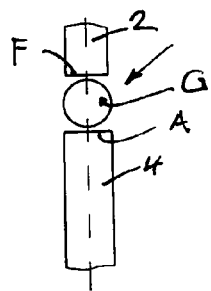
Figure 10:
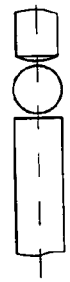
Figure 11:
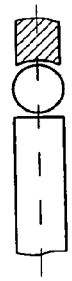
Figure 12:
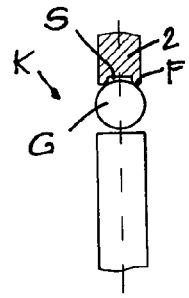
Figure 13:
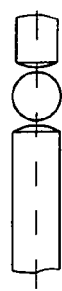
Figure 14:
Figure 15:
Figure 16:
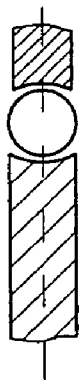
Figure 17:
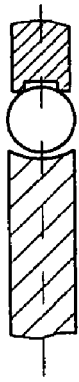
Figure 18:
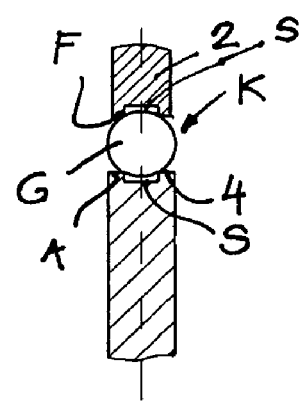

In FIG. 8 the tilt joint K is formed by the planar counter surface F provided at the armature ram 2 and by a significantly smaller, e.g. planar abutment surface A' which is formed centrally at a central projection D of the stem 4. In the shown tilted position of the stem 4 the transmission point for the solenoid force only is displaced very little to the side. Inversely, the projection D also could be formed at the armature ram 2.

In FIGS. 9 to 18 a joint ball G is placed in the tilt joint K between the abutment surface A and the counter surface F. In this case the surfaces can have the following geometrical pairings: planar/planar in FIG. 9; planar/convex in FIG. 10; planar/concave in FIG. 11; planar/planar inclusive one or two central ball seat depressions S in FIG. 12 and FIG. 18; convex/convex in FIG. 13; concave/convex in FIG. 14; planar/convex or planar/concave with a central ball seating depression S in FIG. 15 or FIG. 17; and concave/concave in FIG. 16.

The diameter of the joint ball G corresponds substantially to the diameter of the armature ram 2 and/or the stem 4. The ball joint G even may be somewhat smaller and may be positioned countersunk in the stem 4 or in the armature ram 2 and/or may be firmly pressed in order to form a convex surface in the tilt joint K, similar to FIG. 2.

The invention claimed is:

1. Twin-solenoid valve (D) comprising two valve members (V) which are located side by side and are actuated in closing direction by a common solenoid (M) via a T-shaped force transmission member (G), the force transmission member (G) being guided by a stem (4) in a slide guidance (3), characterised in that a radial safety clearance (X) is provided between the slide guidance (3) and the stem (4), and that at the side of the slide guidance (3) remote from the valve members (V) a tilt joint (K) is provided between the stem (4) of the force transmission member (G) and the armature (B) or a movably guided armature ram (2) of the solenoid (M).

2. Twin-solenoid valve as in claim 1, characterised in that the tilt joint (K) includes directly or indirectly contacting first and second abutment surfaces and counter surfaces (A, F) at the armature (B) or at the armature ram (2) and at the stem (4), the surfaces (A, F) having one of the following geometrical pairings: planar/convex or concave/concave or convex/concave or convex/convex, and that the respective convex or concave abutment surface or counter surface (A, F) has at least a arc curvature within the plane in which both valve members (V) are situated side by side.

3. Twin-solenoid valve as in claim 2, characterised in that the concave or convex arc curvature is a circular arc curvature the curvature centre (Y) of which being situated in the axis of the armature (B) or the armature ram (2) and/or of the stem (4), preferably as a part of a cylinder surface having a cylinder axis (Y) perpendicular to the plane of the valve members (V).

4. Twin-solenoid valve as in claim 2, characterised in that the respective convex or concave abutment surface or counter surface (A, F) is formed as a part of a spherical surface having the centre (Y) in the axis of the armature (B) or the armature ram (2) and/or of the stem (4).

5. Twin-solenoid valve as in claim 2, characterised in that in the geometrical pairing concave/convex the arc curvatures are made equal or that the convex arc curvature is stronger than the concave arc curvature.

6. Twin-solenoid valve as in claim 1, characterised in that the tilt joint (K) is formed by a planar abutment surface (F) either at the stem (4) or at the armature (B) or at the armature ram (2) and a planar abutment surface (A') at a central projection (D) of the respective other component of the armature (B) or the armature ram (2) or the stem (4), the planar abutment surface (A') having a smaller diameter than the counter surface (F).

7. Twin-solenoid valve as in claim 2, characterised in that a joint ball (G) is arranged within the tilt joint (K) between the abutment surface (A) and the counter surface (F).

8. Twin-solenoid valve as in claim 7, characterised in that the joint ball (G) is provided between the abutment surface (F) and the counter surface (F) having one of the following geometrical pairings: planar/planar or planar/concave or planar/convex or concave/concave or concave/convex or convex/convex.

9. Twin-solenoid valve as in claim 8, characterised in that at least one abutment surface or counter surface (A, F) of planar form comprises a central ball seat depression (S) having a diameter smaller than the diameter of the joint ball.

10. Twin-solenoid valve as in claim 1, characterised in that the slide guidance (3) is constituted by at least one plain bearing sleeve which is fitted in a receiving bore of a fixed core part (1) of the solenoid (M), that the force transmitting member (G) penetrates the plain bearing sleeve with a cylindrical stem (4), and that the safety clearance (X) is formed between the stem (4) and the plain bearing sleeve.

11. Twin-solenoid valve as in claim 1, characterised in that the safety clearance (X) amounts to about 2% of the inner diameter of the slide guidance (3).

12. Twin-solenoid valve as in claim 1, characterised in that each valve member (V) is arranged within an inserted sleeve (10), that a screw-in sleeve (9) is arranged above the inserted sleeve (10), that an actuating ram (11) is guided in the screw-in sleeve (9), that the force transmitting member (G) faces the screw-in sleeve (9) with a distance, and that the actuating ram projects beyond the screw-in sleeve (9) such that with the solenoid (M) energized and already reached closing position of the valve member (V) an intermediate space remains between the force transmitting member (G) and the screw-in sleeve (9).

13. Twin-solenoid valve as in claim 2 characterised in that the abutment surfaces and counter surfaces (A, F, A') are of different sizes.

14. Twin-solenoid valve as in claim 3 characterised in that the abutment surfaces and counter surfaces (A, F, A') are of different sizes.

15. Twin-solenoid valve as in claim 4 characterised in that the abutment surfaces and counter surfaces (A, F, A') are of different sizes.

16. Twin-solenoid valve as in claim 5 characterised in that the abutment surfaces and counter surfaces (A, F, A') are of different sizes.

17. Twin-solenoid valve as in claim 7 characterised in that the abutment surfaces and counter surfaces (A, F, A') are of different sizes.

18. Twin-solenoid valve as in claim 8 characterised in that the abutment surfaces and counter surfaces (A, F, A') are of different sizes.

19. Twin-solenoid valve as in claim 9 characterised in that the abutment surfaces and counter surfaces (A, F, A') are of different sizes.

* * * * *